May 7, 1935.  R. J. GRAY  2,000,170
LUBRICATING MEANS
Filed June 28, 1932  2 Sheets-Sheet 1

Inventor
Russell J. Gray
Leonard L. Kalish
Attorney

May 7, 1935. R. J. GRAY 2,000,170
LUBRICATING MEANS
Filed June 28, 1932 2 Sheets-Sheet 2

Inventor
RUSSELL J. GRAY.
By Leonard L. Kalish
Attorney

Patented May 7, 1935

2,000,170

UNITED STATES PATENT OFFICE 2,000,170

LUBRICATING MEANS

Russell J. Gray, Minneapolis, Minn.

Application June 28, 1932, Serial No. 619,748

7 Claims. (Cl. 221—47.3)

My invention relates to a new and useful grease gun and lubrication means for dispensing lubricants under high pressure. My invention further relates to a system of lubrication whereby the lubricant is subjected first to a predetermined low pressure, and then to a predetermined high pressure, and finally to a still higher pressure should the second pressure stage be insufficient;—the last pressure stage being automatically brought into operation only when the second pressure stage is insufficient to move the grease or lubricant.

It is an object of my invention to provide lubricating means whereby the lubricant may be supplied from a remote source of supply at a relatively low pressure of possibly 75 to 150 or 200 pounds, to a manually operable pneumatic dispenser which is portable within the limits of the reach of the flexible hose connections, and from which the lubricant is expelled at an intermediate pressure of several thousand pounds, possibly anywhere from one to three or four thousand pounds, which is ordinarily sufficient for lubricating most any bearing. After the lubricant leaves this intermediate pneumatic grease dispenser, it passes through a final high pressure chamber or passageway, which is normally inoperative and which is brought into operation only by the increase of the pressure to an amount approaching (though somewhat less than) the maximum pressure which the pneumatic dispenser is capable of exerting upon the lubricant. When this latter pressure is reached, then the final high pressure piston is caused to operate, thereby to exert a still higher pressure upon the lubricant, sufficient to clear most any frozen bearing.

A further object of my present invention is to provide lubricating means whereby the highest pressure which is created automatically by the system (when the resistance to the flow of lubricant, caused by a "frozen" bearing, builds up a pressure approaching the maximum pressure provided for normal operation) is not left within the control of the operator but whereby such maximum pressure (brought on by a frozen bearing) is still controlled by the system itself wholly independently of the operator, thereby tending to prevent any damage to the part or to the mechanism to be lubricated by the sudden application of excessive pressures which operators may be inclined to apply to "frozen" bearings.

With the above and other objects in view, my invention consists of a certain novel lubricating system whereby two successive pairs of differential pistons, the first pair air-actuated and the second pair lubricant-actuated, and a resistance spring and a check-valved by-pass associated with the second pair of differential pistons, are so related to each other that in the normal operation of the system (in the lubrication of bearings not substantially "frozen") with a source of compressed air more or less within the usual range of relatively low pressure (between 50 and 200 pounds per square inch), the spring will maintain the second pair of differential pistons in an inoperative condition (and thus cause the flow of lubricant through said by-pass), and so that whenever the system is connected with and is caused to operate in connection with a substantially "frozen" bearing which increases the resistance to the flow of lubricant through said by-pass to a pressure approaching (though somewhat less than) the maximum lubricant pressure which the first pair of differential pistons are capable of developing (that is, the pressure of the source of compressed air multiplied by the pressure ration of the first pair of differential pistons), the thus increased lubricant pressure acting upon the larger of the second pair of differential pistons will overcome the resistance of said spring and cause said second pair of differential pistons to move forward and to expel a small amount of lubricant into the bearing to be lubricated at a still higher pressure;—said last pressure however, being conditioned wholly upon the initial air pressure and being generally without the control of the operator.

My invention further consists of certain novel features of construction in the second pair of differential pistons and associated elements whereby the action of the same may be improved.

My invention further consists of other novel features and details of construction, all of which will appear more fully from the following detailed description.

For the purpose of illustrating my invention, I have shown in the accompanying drawings, one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawings in which like reference characters indicate like parts:

Figure 3:
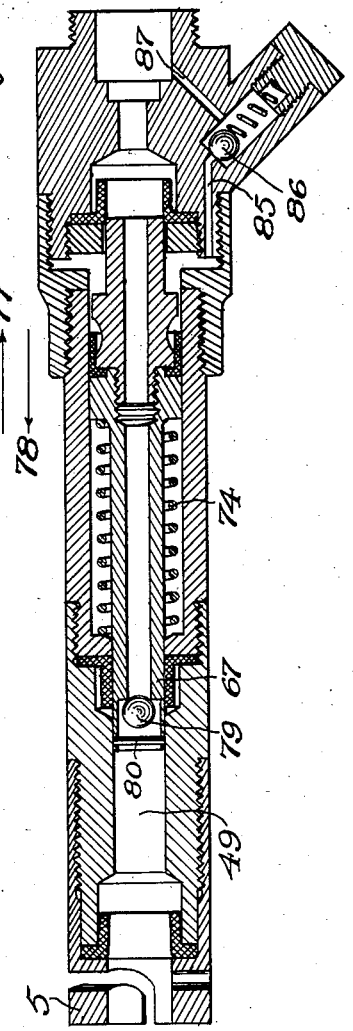
Figure 3 represents a similar sectional view of the high pressure means, showing the same in the beginning of its operative stroke.

In carrying out my invention, I employ any suitable source of lubricant under relatively low pressure, as for instance, a source of supply like that shown in Figure 3 of my U. S. Patent No. 1,917,966, from which the lubricant is transmitted through the flexible hose 5 under relatively low pressure, through the swivel connection 6, to the handle 7 of the pneumatic grease dispenser 8, and thence through the duct 9 to the intake port 10 of the pressure cylinder 11. The pressure cylinder 11 contains the pressure piston 12, which is directly affixed or connected to the pneumatic piston 13 operating within the pneumatic cylinder 14, which is formed integrally with the pressure cylinder 11.

Figure 1:
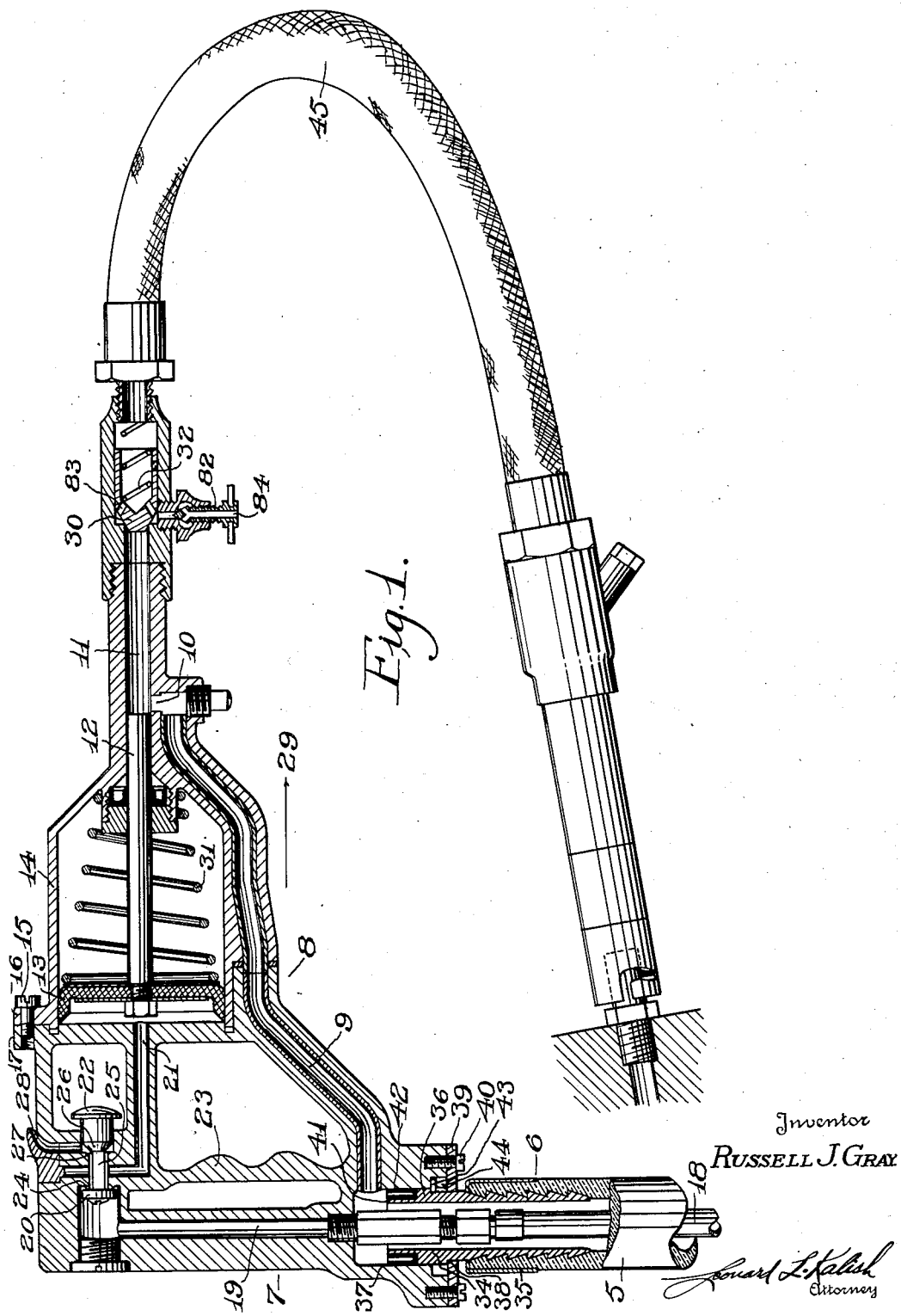
Figure 1 represents a sectional view of the intermediate pressure means, that is, the manually operable pneumatic grease dispenser, showing the high pressure means in full view.

The pneumatic cylinder 14 is detachably secured to the handle portion 7 of the pneumatic grease dispenser 8, by means of a series of bolts 15, and the flanges 16 and 17, as shown particularly in Figure 1.

A flexible compressed air hose 18 is extended through the flexible lubricant hose 5, as indicated particularly in Figure 1, and is connected to any source of compressed air (not shown in the drawings). The compressed air hose is directly connected to the air duct 19 within the handle, and hence comes through the manually operable valve 20 with the air inlet port 21 leading to the pneumatic cylinder 14.

By depressing the knob or button 22 with the index finger, while the hand grips the handle at the portion 23, the valve 20 is unseated from the valve seat 24, and admits the compressed air past the valve stem 25. During this operation, the conical exhaust valve 26 is seated against the valve seat 27, and thereby prevents the escape of the compressed air through the exhaust port 28.

The compressed air propels the pneumatic piston 13 in the direction of the arrow 29, and causes the lubricant admitted into the pressure cylinder 11 to be expelled past the check valve 30. The spring 31 returns the pneumatic piston 13, and the grease piston 12 when the air pressure is released by releasing the button 22. The spring 32 in turn closes the check valve 30 and thus prevents the return of lubricant, and thus admits a new charge from the supply duct 9 and hose 5.

The swivel 6 is formed of the metallic bushing 34, the outer end of which enters the hose 5 and to which the hose is anchored by means of any suitable exterior metallic clamping seal 35, and the inner end 36 of which enters and is journalled within the bore 37 in the handle member 7. The diameter of the bushing 34 is reduced slightly so as to produce a slight annular shoulder 38, which is adapted to be engaged by an annular retainer plate or disc 39 held in place by screws 40, thereby rotatably to lock the bushing 34 within the bore 37 of the handle 7. The innermost end of the bushing 34 is also reduced at 41, and a U-shaped packing gasket 42 of leather or other similar material, is interposed between the bore 37 in the handle member and the reduced diameter portion 41 of the bushing 34 so as to seal the swivel joint against the grease or lubricant. In order to limit the swivelling movement of the bushing 34 and hose 5 in relation to the handle 7, suitable stops 43 and 44 are provided on the bushing 34 and in the handle portion 7 respectively, so as to limit the swivelling movement to approximately one revolution or slightly less. This is in order to prevent the inner compressed air hose 18 from being twisted unduly, since the connection of said inner compressed air to the handle member is not swivelled but is fixed.

The lubricant expelled by the piston 12 is then transmitted through any suitable flexible hose 45, into the chamber 46 of the high pressure means. Here the lubricant normally passes through the center passageway 47 and the passageway 48, into the chamber 49 and out through the coupling member 50 into the lubricant receptacle or grease cup 51 permanently connected to the bearing to be lubricated.

The housing of the high pressure unit or means is formed of sections 52, 53, 54, 55, and 56;—the latter section being a bayonet coupling or other suitable coupling member.

Within the housing member 52, a hat-shaped washer 57 of leather or other suitable material, is fixedly secured around its periphery 58, by means of an externally threaded annular lock ring 59, which is threaded into the enlargement in the inner end of the housing member 52.

Figure 2:
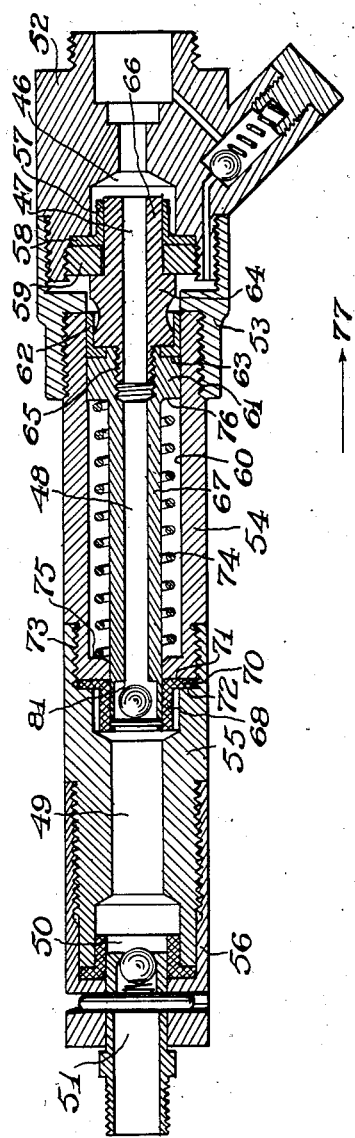
Figure 2 represents a sectional view of the high pressure grease expelling means in the inoperative condition, that is, in the condition in which it merely affords a clear passageway for the lubricant.
Figure 4:
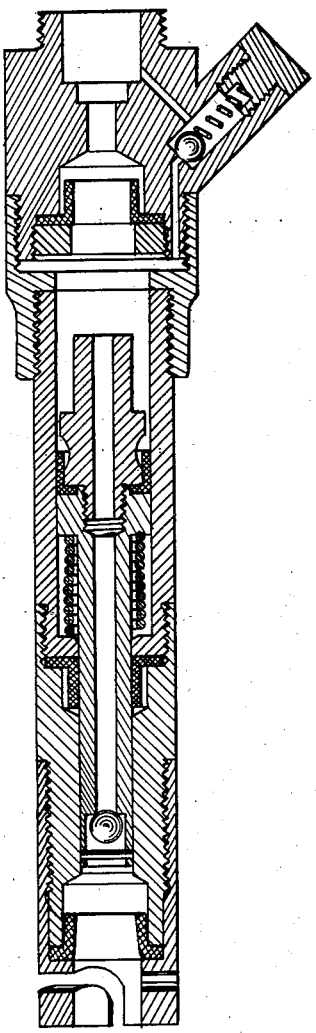
Figure 4 represents a similar sectional view of the high pressure means showing the same at the end of its operative stroke.

Within the housing member 54, a cylindrical bore 60 is provided, within which the piston member 61 is adapted to travel. The piston member 61 is provided with the cup-shaped packing gasket or washer 62 of leather or other suitable packing material, held in place against the shoulder 63 by a piston member 64, which is provided with a reduced diameter threaded portion 65, which is threaded into the piston member 61, as shown in Figures 2, 3 and 4.

The piston member 64 is provided with a cylindrical piston portion 66 of a diameter somewhat less than the diameter of the piston 61, and fitting snugly within the hat-shaped packing gasket 57, as shown particularly in Figure 1.

The piston member 61 is integral with a smaller diameter high pressure piston 67, which fits snugly within a hat-shaped washer or gasket 68, of leather or other suitable packing material, which is held in position by its flange 70, between the shoulders 71 and 72 of the two housing members 54 and 55, which are threadedly secured to each other at 73. The piston 67 is adapted to pass through the hat-shaped packing gasket 68 and into the high pressure cylinder 49.

A helical compression spring 74 of suitable strength is operatively interposed between a shoulder 75 of the housing member 54, and a shoulder 76 intermediate the low pressure piston member 61 and the high pressure piston member 67. The spring 74 urges the rigidly interconnected piston members 66, 61 and 67 in the direction of the arrow 77, and so long as the pressure within the chamber 46 and the passageways 47, 48, and 49 is below a certain fixed limit (determined by the strength of the spring 74 and relative diameters of the pistons 66, 61 and 67) the pistons will be in the extreme inoperative position shown in Figure 2. As the pressure within the cylinder 49 and passageways 48, 47 and chamber 46 increases, by reason of an obstruction in the bearing to which the grease cup 51 is connected, or by reason of an obstruction in the passageway leading to the bearing which prevents the grease from passing out through said passageways, the pressure within the chamber 46 upon the piston portion 66 causes all three pistons 66, 61 and 67 to be moved forward in the direction of the arrow 78. This causes the piston 66 to pass out of the gasket 57 until the grease obtains direct access to the somewhat larger diameter piston 61. This permits the grease to exert a still greater force upon the movable piston unit and causes the piston unit to travel forward in the direction of the arrow 78 with greater force. By reason of the relatively greater diameter of the piston 61, and the relatively smaller diameter of the piston 67, a much increased pressure is developed within the cylinder 49;— said pressure being equal to the pressure being delivered by the piston 12, (Figure 1) multiplied by the ratio between the effective areas of the piston 61 and the piston 67; less the pressure of the spring 74. A ball check valve 79, loosely held in place by the pin 80, seats against a valve seat 81 as soon as the pistons travel forward in the direction of the arrow 78, thereby trapping the lubricant or grease ahead of the check valve 79, within the high pressure cylinder 49, and exerting upon the thus entrapped grease a pressure greater than the pressure of the grease as delivered by the piston 12 (Figure 1). This forward travel continues to the full limit of the movement of the pistons, so long as grease is supplied from the pneumatic unit shown in Figure 1. When the piston 67 has travelled through its full stroke and has delivered the contents of the cylinder 49 to the bearing at the increased pressure, the pressure within the hose line 45 is relieved by unscrewing the relief valve 82, which permits the escape of the pressure through the openings 83 and the check valve 30 and the opening 84 in the relief valve 82.

As soon as the pressure within the hose 45 drops below that which is required by the spring 74, either by the relief through the opening 84 or by a complete clearance of the bearing being lubricated, the spring 74 returns the pistons to their original condition shown in Figure 2. During the latter part of this return stroke, the last portion of grease is by-passed through a by-pass opening 85 and the spring-pressed check valve 86 and the by-pass opening 87.

This cycle of operations is repeated whenever the pressure built up by a clogged bearing increases to the predetermined amount, whereupon the pistons automatically move forward and force a small amount of grease forward with an increased pressure. As soon as the pressure drops by a clearance of the bearing opening, or by a manual relief through the opening 84, the pistons return to their original position, and the operation may be repeated again.

The pressure of the spring 74 and the relative diameters of the piston members 66, 61 and 67 are so proportioned with relation to the air-pressure and the diameter of the pneumatic piston 13 and the grease piston 12, that the piston unit composed of the pistons 66, 61 and 67 will move forward in the direction of the arrow 78 at a pressure somewhat below the maximum pressure which the piston 12 is capable of producing with the available air pressure delivered through the hose 18.

In this manner, a relatively large quantity of grease may be delivered normally by the piston 12 at pressures which are sufficient to deliver the grease into the great majority of the bearings. Whenever the coupler 56 is connected onto a particularly clogged bearing, however, the piston unit composed of the pistons 66, 61 and 67 is brought into operation automatically to exert a considerably higher pressure upon a a small quantity of grease, thereby to clear the bearing and to deliver a charge of grease thereinto. This eliminates the necessity of resorting to outside means for clearing clogged bearings, and the same system may be applied to all bearings, whether normal or clogged, without change of adjustment or change of initial pressure. The means herein disclosed is applicable to the system shown in my patent hereinabove identified.

I am aware that my invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I hereby claim as new and useful, and desire to secure by Letters Patent, is:

1. A lubricating system comprising in combination a tubular housing having a large diameter low pressure lubricant cylinder nearer the intake end thereof, and having a small diameter and high pressure lubricant cylinder nearer the discharge end thereof, a piston unit movably mounted within said housing, having a large diameter low pressure lubricant actuated piston operatively disposed within said low pressure cylinder, and a small diameter high pressure lubricant expelling piston operatively connected therewith and disposed in cooperative relation to said high pressure cylinder, a lubricant passageway extending through said pistons, and normally interconnecting the intake end and the discharge end of said housing, a check valve carried in the discharge end of said lubricant passageway adapted normally to permit the free flow of lubricant therethrough, but adapted to close when the pressure of lubricant ahead of the pistons increases, a spring of predetermined strength operatively interposed between said housing and said pistons, tending to urge the latter towards the intake end of said housing, pneumatic lubricant dispensing means flexibly connected to the intake end of the aforesaid housing through a flexible lubricant conduit, said pneumatic grease dispensing means including a lubricant expelling piston operatively disposed within a lubricant cylinder, a larger diameter air-actuated piston operatively disposed within a pneumatic cylinder and operatively connected with said lubricant piston, and means for delivering lubricant to said lubricant cylinder at a relatively low pressure, and for delivering compressed air to said pneumatic cylinder at a relatively low pressure;—the effective area of the first-mentioned low pressure lubricant actuated piston and the strength of the first mentioned spring being so proportioned with relation to each other and to said last-mentioned air-actuated piston and said last-mentioned lubricant-expelling piston, as to cause the first-mentioned low and high pressure pistons to travel forward against the force of the first-mentioned spring at a pressure somewhat below the maximum pressure which the last-mentioned lubricant-expelling piston is capable of delivering to the intake end of the aforesaid housing.

2. A lubricating system comprising in combination a portable pneumatic lubricant dispenser, including a lubricant cylinder having a relatively low-pressure lubricant-expelling piston operatively disposed therein, and having an intake port and a discharge port, a larger diameter pneumatic cylinder having an air-actuated piston operatively disposed therein, and operatively connected with said lubricant-expelling piston, a source of lubricant supply under a relatively lower pressure, connected with the aforesaid lubricant cylinder, a remote source of compressed air flexibly connected to said lubricant dispenser, means for causing said compressed air to expel successive charges of lubricant from the lubricant cylinder of said pneumatic lubricant dispenser, a tubular metallic housing flexibly connected to the discharge port of the lubricant cylinder of said pneumatic lubricant dispenser, said tubular housing having a large-diameter low-pressure lubricant cylinder nearer the intake end thereof, and having a small diameter and high-pressure lubricant cylinder nearer the discharge end thereof, a piston unit movably mounted within said housing, having a large diameter low pressure piston operatively disposed within said low-pressure cylinder, and a small diameter high-pressure piston operatively connected therewith and operatively disposed within said high pressure cylinder, a lubricant passageway extending through said pistons, and normally interconnecting the intake end and the discharge end of said housing, a check valve carried in said lubricant passageway adapted normally to permit the free flow of lubricant therethrough, but adapted to close when the pressure of lubricant ahead of the pistons increases, a spring of predetermined strength operatively interposed between said housing and said last-mentioned piston unit, tending to urge the latter towards the intake end of said housing; and effective area of the low pressure piston of said last-mentioned piston unit and the strength of the spring acting upon said piston unit being so proportioned with relation to each other and to said first-mentioned air-actuated piston and lubricant-expelling piston, as to cause said last-mentioned piston unit to travel forward against the force of the spring at a pressure somewhat below the maximum pressure which the air-actuated piston is capable of delivering to the intake end of said tubular metallic housing.

3. A booster unit comprising a tubular housing having an intake port at one end and a discharge port at the other end, a series of three cylinders within said tubular housing of three different diameters;—the intermediate diameter being nearest the intake port of the housing, and the smallest diameter being nearest the discharge port of the housing, and the largest diameter being disposed intermediate of the two, a piston unit operatively disposed within said housing, having three piston portions of diameters corresponding to the three cylinder portions and being arranged to fit within the corresponding cylinder portions of the housing, a spring operatively interposed between said piston unit and said housing, tending to urge the piston unit towards the intake port of the housing, a passageway extending through said piston unit and affording, in the inoperative position of the booster unit, a free passageway for lubricant from the intake port to the discharge port of the housing, and a check valve adapted to close the passageway through the housing and through said piston unit in a direction from the discharge port towards the intake port of the housing.

4. A booster unit comprising a tubular housing having an intake port at one end and a discharge port at the other end, a series of three cylinders within said tubular housing of three different diameters;—the intermediate diameter being nearest the intake port of the housing, and the smallest diameter being nearest the discharge port of the housing, and the largest diameter being disposed intermediate of the two, a piston unit operatively disposed within said housing, having three piston portions of diameters corresponding to the three cylinder portions and being arranged to fit within the corresponding cylinder portions of the housing, a spring operatively interposed between said piston unit and said housing, tending to urge the piston unit towards the intake port of the housing, a passageway extending through said piston unit and affording, in the inoperative position of the booster unit, a free passageway for lubricant from the intake port to the discharge port of the housing, and a check valve carried by the piston unit, adapted to close the passageway through the housing and through said piston unit to the flow of lubricant in a direction from the discharge port towards the intake port of the housing.

5. A booster unit comprising a tubular housing having an intake port at one end and a discharge port at the other end, a series of three cylinders within said tubular housing of three different diameters;—the intermediate diameter being nearest the intake port of the housing, and the smallest diameter being nearest the discharge port of the housing, and the largest diameter being disposed intermediate of the two, a piston unit operatively disposed within said housing, having three piston portions of diameters corresponding to the three cylinder portions and being arranged to fit within the corresponding cylinder portions of the housing, a spring operatively interposed between said piston unit and said housing, tending to urge the piston unit towards the intake port of the housing, a passageway extending through said piston unit and affording, in the inoperative position of the booster unit, a free passageway for lubricant from the intake port to the discharge port of the housing, and a check valve adapted to close the passageway through the housing and through said piston unit in a direction from the discharge port towards the intake port of the housing;—the piston of intermediate diameter being adapted to shield the piston of the largest diameter from the lubricant when the piston unit is in its initial position, and to uncover said largest piston to the lubricant after the piston unit has travelled a part of the distance towards the discharge end of the housing.

6. A booster unit comprising a tubular housing having an intake port at one end and a discharge port at the other end, a series of three cylinders within said tubular housing of three different diameters;—the intermediate diameter being nearest the intake port of the housing, and the smallest diameter being nearest the discharge port of the housing, and the largest diameter being disposed intermediate of the two, a piston unit operatively disposed within said housing, having three piston portions of diameters corresponding to the three cylinder portions and being arranged to fit within the corresponding cylinder portions of the housing, a spring operatively interposed between said piston unit and said housing, tending to urge the piston unit towards the intake port of the housing, a passageway extending through said piston unit and affording, in the inoperative position of the booster unit, a free passageway for lubricant from the intake port to the discharge port of the housing, and a check valve carried by the piston unit, adapted to close the passageway through the housing and through said piston unit to the flow of lubricant in a direction from the discharge port towards the intake port of the housing;—the piston of intermediate diameter being adapted to shield the piston of the largest diameter from the lubricant when the piston unit is in its initial position and to uncover said largest piston to the lubricant after the piston unit has travelled a part of the distance towards the discharge end of the housing and a check-valve controlled by-pass adapted to permit the return flow of lubricant when the pressure of the source is lowered.

7. A lubricating system comprising, in combination, two pairs of differential cylinders, the larger of the first pair being adapted to be connected with any suitable source of compressed air of any suitable relatively low pressure, through any suitable air-control valve, and having also an exhaust port whereby compressed air of any suitable relatively low pressure may be alternately admitted into said cylinder and then permitted to exhaust therefrom; and the smaller of the first pair being adapted to communicate with a source of lubricant supply, and having its discharge end in communication with the intake end of the larger of the second pair of differential cylinders, a pair of differential pistons reciprocable in said first pair of differential cylinders, the larger being adapted to be actuated through its driving stroke by the compressed air adapted to be admitted into said larger cylinder, and being adapted to drive the smaller through its operative stroke, and the smaller piston being adapted to deliver predetermined charges of lubricant to the larger of the second pair of differential cylinders, a pair of differential pistons reciprocable in said second pair of differential cylinders, and adapted to be propelled in one direction through an operative stroke by the lubricant delivered by the smaller of the first pair of differential pistons, a return spring adapted to propel said second pair of differential pistons in the opposite directions; and a check-valved by-pass extending from the larger to the smaller of said second pair of differential cylinders, the ratio of effective areas of the first pair of differential pistons and the effective area of the larger of said second pair of differential pistons and the strength of said return spring being so proportioned with relation to each other as to prevent the movement of the second pair of differential pistons against the force of the return spring, and to cause the flow of lubricant through said by-pass so long as the resistance to such flow is relatively low, and as to cause said second pair of differential pistons to travel forward against the force of said return spring when the resistance to the flow of lubricant through said by-pass is increased to a pressure somewhat below the maximum pressure which the smaller of the first pair of differential pistons is adapted to deliver to the larger of the second pair of differential cylinders.

RUSSELL J. GRAY.